United States Patent [19]

Bayer

[11] Patent Number: 4,549,212

[45] Date of Patent: Oct. 22, 1985

[54] IMAGE PROCESSING METHOD USING A COLLAPSED WALSH-HADAMARD TRANSFORM

[75] Inventor: Bryce E. Bayer, Rochester, N.Y.

[73] Assignee: Eastman Kodak Company, Rochester, N.Y.

[21] Appl. No.: 522,278

[22] Filed: Aug. 11, 1983

[51] Int. Cl.[4] .......................... H04N 5/21; H04N 5/14
[52] U.S. Cl. .................................. 358/167; 358/284; 364/727
[58] Field of Search ............... 358/166, 167, 284, 133, 358/113, 138, 260; 382/43; 364/727

[56] References Cited

U.S. PATENT DOCUMENTS

| | | | |
|---|---|---|---|
| 4,055,756 | 10/1977 | Jolivet et al. | 364/725 |
| 4,179,709 | 12/1979 | Workman | 358/133 |
| 4,242,705 | 12/1980 | Ebihara | 358/167 |
| 4,442,454 | 4/1984 | Powell | 358/167 |

OTHER PUBLICATIONS

"Hadamard Transform Image Coding," by W. K. Pratt, H. C. Andrews, and J. Kane, *Proceedings of the IEEE*, 57, 1, Jan. 1969, pp. 58–68.

"Digital Technique of Reducing Television Noise," by J. P. Rossi, *Journal of the Society of Motion Picture and Television Engineers*, Mar. 1978, pp. 134–140.

"Mathematical Analysis: On a generalization of the Hermite polynomials," by M. Krawtchouk, Academy of Sciences (Fr.), reported from the meeting of Sep. 23, 1929, pp. 620–622 (original in French).

*Primary Examiner*—John C. Martin
*Assistant Examiner*—E. Anne Toth
*Attorney, Agent, or Firm*—David M. Woods

[57] ABSTRACT

An improved image processing method uses a modified Walsh-Hadamard transform to remove noise and preserve image structure in a sampled image. Image signals representative of the light value of elements of the image are grouped into signal arrays corresponding to blocks of image elements. These signals are mapped into larger signal arrays such that one or more image signals appear two or more times in each larger array. The larger arrays are transformed by Walsh-Hadamard combinations characteristic of the larger array into sets of coefficient signals. Noise is reduced by modifying—i.e., coring or clipping—and inverting selected coefficient signals so as to recover processed signals—less noise—representative of each smaller signal array. The results exhibit acceptable rendition of low contrast detail while at the same time reducing certain processing artifacts characteristic of the unimproved Walsh-Hadamard block transform.

12 Claims, 14 Drawing Figures $$\begin{array}{cc} 1 & 1 \\ 1 & 1 \end{array} \qquad \begin{array}{cc} 1 & -1 \\ 1 & -1 \end{array}$$

$$\begin{array}{cc} 1 & 1 \\ -1 & -1 \end{array} \qquad \begin{array}{cc} 1 & -1 \\ -1 & 1 \end{array}$$

FIG. 1

$$A = \begin{bmatrix} 1 & 2 & 1 \\ 2 & 4 & 2 \\ 1 & 2 & 1 \end{bmatrix} \qquad B = \begin{bmatrix} 1 & 0 & 2 & 0 & 1 \\ 0 & 0 & 0 & 0 & 0 \\ 2 & 0 & 4 & 0 & 2 \\ 0 & 0 & 0 & 0 & 0 \\ 1 & 0 & 2 & 0 & 1 \end{bmatrix}$$

FIG. 5

```
A.                B.                    C.
FIRST             SECOND                THIRD
STAGE             STAGE                 STAGE x x x             x - x - x -           x - - - x - - - x - - -
x x x             - - - - - -           - - - - - - - - - - - -
x x x             x - x - x -           - - - - - - - - - - - -
                  - - - - - -           - - - - - - - - - - - -
                  x - x - x -           x - - - x - - - x - - -
                  - - - - - -           - - - - - - - - - - - -
                                        - - - - - - - - - - - -
                                        - - - - - - - - - - - -
                                        x - - - x - - - x - - -
                                        - - - - - - - - - - - -
                                        - - - - - - - - - - - -
                                        - - - - - - - - - - - -
```

IMAGE PROCESSING METHOD USING A COLLAPSED WALSH-HADAMARD TRANSFORM

BACKGOUND OF THE INVENTION

1. Field of the Invention

The invention relates to image processing methods for reducing noise in a sampled image. More specifically, the invention pertains to an image processing method which uses the Walsh-Hadamard transform to remove noise and preserve image structure.

2. Description Relative to the Prior Art

Image processing methods using the Walsh-Hadamard transform are well known to those of ordinary skill in the image processing art. For that reason, the description relative to the prior art and relative to an embodiment of the invention will include only such detail regarding the Walsh-Hadamard transform as is useful and sufficient to describe the improved use of the transformation in accordance with the invention. For further information regarding the Walsh-Hadamard transform, reference may be made to *Digital Image Processing* by W. K. Pratt (John Wiley & Sons, New York, 1978) and especially chapter 10 thereof, "Two-Dimensional Unitary Transforms" and the bibliographic references cited therein (especially "Hadamard Transform Image Coding," by W. K. Pratt, H. C. Andrews, and J. Kane, *Proc. IEEE*, 57, 1, January 1969, 58–68).

In the interest of processing efficiency, the Walsh-Hadamard transform may be configured to operate on relatively small arrays of image signals generated from blocks of image elements—a type of transform processing herein referred to as block processing. In addition, the overall process may be partitioned into a number of stages. Both of these features are found in commonly assigned, copending patent application Ser. No. 441,826, now U.S. Pat. No. 4,442,454 "Image Processing Method Using a Block Overlap Transformation Procedure," filed Nov. 15, 1982), which describes a transform processing method that operates in a hierarchy of stages, each stage employing a Walsh-Hadamard block transform operating on an array of image signals derived from a preceding stage. In particular, one embodiment described in Ser. No. 441,826, now U.S. Pat. No. 4,442,454 shows a 2 by 2 Walsh-Hadamard transform operating on a 2 by 2 array of image signals.

Processed images resulting from an image processing method using such a 2 by 2 Walsh-Hadamard transform often display artifacts introduced by the processing method itself. These artifacts may be suppressed by using a Walsh-Hadamard transform operating on a larger array of image signals, such as a 4 by 4 array generated from a 4 by 4 block of image elements. Such a method—employing a 4 by 4 array—is described in commonly assigned, copending patent application Ser. No. 522,284, entitled "Transform Processing Method For Reducing Noise In An Image," and filed on even date herewith. However, while suppressing these artifacts, certain image features, such as low-contrast edges, rendered well by the smaller 2 by 2 transform, are relatively degraded by use of the larger 4 by 4 transform. Before describing my solution to this type of problem, it is helpful to review certain known aspects of the Walsh-Hadamard transformation, in both 2 by 2 and 4 by 4 configurations.

Starting with a 2 by 2 Walsh-Hadamard transform, let a 2 by 2 block of image elements be represented as a block of four image elements $A_{ij}$, as follows.

$$\begin{bmatrix} A_{11} & A_{12} \\ A_{21} & A_{22} \end{bmatrix}$$

The corresponding image signals are generated from the light values of these elements (light value, as used herein shall mean any image-related characteristic—e.g., lightness, brightness, density, hue and the like—that can be expressed in a form suitable for image processing). The image signals are represented as an array of four image signals $a_{ij}$, as follows.

$$\begin{bmatrix} a_{11} & a_{12} \\ a_{21} & a_{22} \end{bmatrix}$$

An array of four transform coefficient signals $c_{ij}$, $$\begin{bmatrix} c_{11} & c_{12} \\ c_{21} & c_{22} \end{bmatrix}$$

are generated from the image signals in four linear arithmetic combinations characteristic of the 2 by 2 Walsh-Hadamard transform, as follows.

$$c_{11} = a_{11} + a_{12} + a_{21} + a_{22}$$

$$c_{12} = a_{11} - a_{12} + a_{21} - a_{22}$$

$$c_{21} = a_{11} + a_{12} - a_{21} - a_{22}$$

$$c_{22} = a_{11} - a_{12} - a_{21} + a_{22}$$

Each coefficient signal is a particular linear combination of the light values from image elements within the block. Each combination (except coefficient signal $c_{11}$) represents a particular component of the image structure—such as detail—and tends to vanish in the absence of that particular kind of structure.

By inspecting these linear arithmetic combinations, it can be seen that each coefficient signal corresponds to a particular summation of all the image signals in the block, allowing some image signals to be positive (multiplied by +1) and others to be negative (multiplied by −1). In this connection, FIG. 1 is an abbreviated way of listing the arithmetic operations necessary to generate these linear combinations. The ±1 multipliers for each linear combination mentioned above are grouped into an array of four multipliers, each multiplier corresponding in position to the image element, and signal, it operates upon. Four such arrays are provided corresponding to the four linear arithmetic combinations mentioned above for generating the four coefficient signals. The array composed of four +1 multipliers generates an average coefficient signal (the $c_{11}$ coefficient signal) over the 2 by 2 area. The other three arrays generate coefficient signals in response to differences in light value between image elements—differences that represent image gradients.

Noise is reduced in the processed image by modifying one or more of the coefficient signals. The noise reduction process typically involves either coring or clipping. Coring is a non-linear noise reduction process that removes coefficient signal ernegy—presumably noise—near the average coefficient signal axis and less than a threshold; signal energy in the remaining coefficient signals is then combined with low-pass signal energy represented by the average coefficient signal. The effect of this combination occurs during the inverse transformation of the coefficient signals, which will be described further in the upcoming description. (See "Digital Techniques of Reducing Television Noise," by J. P. Rossi, *Journal of the Society of Motion Picture and Television Engineers*, Mar. 1978, pp. 134-140.) Clipping is a complementary process that removes coefficient signal energy—presumably image detail—that is above a threshold; the noise signal remaining after inverse transformation is then subtracted from a full-band image signal.

Processed image signals (representing the original image signals less noise) are then recovered by inverse transforming the coefficient signals, including the one or more that were modified (and, in the case of clipping, subtracting the inverted signals from the full-band image signal). Since the Walsh-Hadamard transform is exactly invertible, the four processed image signals $a'_{ij}$ are recovered by employing the four combinations represented in FIG. 1, but now with the coefficient signals in place of the unprocessed image signals (and a proportionality factor of $\frac{1}{4}$), as follows.

$$a'_{11} = \tfrac{1}{4}(c_{11} + c_{12} + c_{21} + c_{22})$$

$$a'_{12} = \tfrac{1}{4}(c_{11} - c_{12} + c_{21} - c_{22})$$

$$a'_{21} = \tfrac{1}{4}(c_{11} + c_{12} - c_{21} - c_{22})$$

$$a'_{22} = \tfrac{1}{4}(c_{11} - c_{12} - c_{21} + c_{22})$$

The 2 by 2 Walsh-Hadamard transform performs particularly well in reconstructing small, local image gradients such as found in low-contrast detail, like edges. However, any coefficient signal sensitive to a block-wide local gradient is similarly sensitive to segments of more extended gradients. For example, a coefficient signal generated from a block covering only a few image elements not only responds to the abrupt change of a small, local gradient, e.g., a low contrast edge, but also responds to a gradual change in a smooth, extended image gradient—such as is frequently found within smooth areas of scene objects. An artifact arises when a threshold set up to distinguish low contrast detail in a local block is "falsely" triggered by a smooth, extended gradient. Then, an abrupt discontinuity—much like an "edge"—will undesirably appear in the processed image at the point where the threshold is crossed and the corresponding linear combination is undesirably modified. Hence the name "false edge" artifact is given to such unwanted transitions arising from use of a method such as described in Ser. No. 441,826, now U.S. Pat. No. 4,442,454.

The heretofore-cited patent application Ser. No. 522,284, describes a transform processing method that suppresses the "false edge" artifact by modifying—i.e., coring or clipping—and inverting only selected transform coefficient signals from each array of signals $c_{ij}$. In order to do this with the Walsh-Hadamard transform, it is necessary to transform a larger number of image signals than are provided by a 2 by 2 block of image elements. The size suggested in Ser. No. 522,284 is one including signals from a 4 by 4 block of image elements.

Apart from involving a larger block of image elements and therefore involving a greater number of linear combinations, the operation of the 4 by 4 Walsh-Hadamard transform is analogous to that of the 2 by 2 Walsh-Hadamard transform. As an example, let a 4 by 4 block of image elements be represented as a block of sixteen image elements $A_{ij}$, $$\begin{bmatrix} A_{11} & A_{12} & A_{13} & A_{14} \\ A_{21} & A_{22} & A_{23} & A_{24} \\ A_{31} & A_{32} & A_{33} & A_{34} \\ A_{41} & A_{42} & A_{43} & A_{44} \end{bmatrix}$$

and the image signals obtained from the corresponding light values as an array of sixteen image signals $a_{ij}$, as follows.

$$\begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix}$$

An array of sixteen coefficient signals $c_{ij}$, $$\begin{bmatrix} c_{11} & c_{12} & c_{13} & c_{14} \\ c_{21} & c_{22} & c_{23} & c_{24} \\ c_{31} & c_{32} & c_{33} & c_{34} \\ c_{41} & c_{42} & c_{43} & c_{44} \end{bmatrix}$$

is generated from the image signals in sixteen linear arithmetic combinations characteristic of the 4 by 4 Walsh-Hadamard transform, as follows (in part).

$$c_{11} = a_{11} + a_{12} + a_{13} + a_{14} + a_{21} + a_{22} + a_{23} + a_{24} + \quad (1)$$
$$\qquad a_{31} + a_{32} + a_{33} + a_{34} + a_{41} + a_{42} + a_{43} + a_{44}$$
$$c_{12} = a_{11} + a_{12} - a_{13} - a_{14} + a_{21} + a_{22} - a_{23} - a_{24} +$$
$$\qquad a_{31} + a_{32} - a_{33} - a_{34} + a_{41} + a_{42} - a_{43} - a_{44}$$
$$c_{13} = a_{11} - a_{12} - a_{13} + a_{14} + a_{21} - a_{22} - a_{23} + a_{24} +$$
$$\qquad a_{31} - a_{32} - a_{33} + a_{34} + a_{41} - a_{42} - a_{43} + a_{44}$$

$$\vdots$$

$$c_{44} = a_{11} - a_{12} + a_{13} - a_{14} - a_{21} + a_{22} - a_{23} + a_{24} +$$
$$\qquad a_{31} - a_{32} + a_{33} - a_{34} - a_{41} + a_{42} - a_{43} - a_{44}$$

FIG. 2 is a list of the sixteen arrays of $\pm 1$ multipliers used in these sixteen arithmetic combinations for generating the corresponding sixteen coefficient signals $c_{ij}$. (It will be evident from FIG. 2 how to form the arithmetic combinations not shown above.) Apart from the average coefficient signal $c_{11}$, each coefficient signal is generated from differences in light value between image elements within the 4 by 4 block.

When the transform coefficient signals from the preceding 4 by 4 Walsh-Hadamard transform are processed in accordance with the heretofore-cited Ser. No. 522,284—that is, by modifying and inverting all but selected coefficient signals—the "false edge" artifact in the processed image is reduced. However, low-contrast detail in the processed image now suffers in comparison to the output from a transformation method based on use of the 2 by 2 Walsh-Hadamard transform, such as described in the heretofore cited Ser. No. 441,826, now U.S. Pat. No. 4,442,454. The choice of the transform block size involves a trade-off between suppression of artifact and rendition of certain types of image structure, especially low contrast detail. From an aesthetic viewpoint, such artifacts detract from the overall visual appeal of images processed by such methods. On the other hand, the preservation of low-contrast detail in the processed image is desirable for aesthetic reasons. Whichever Walsh-Hadamard transform is chosen, the resulting processed image has aspects that are aesthetically unappealing. My invention provides more appealing results by striking a better balance between artifact and image structure.

SUMMARY OF THE INVENTION

I have found that the Walsh-Hadamard transform can be used to better advantage in block processing if the transform generates its characteristic linear combinations from an unconventional ordering of the image signals available to the transform. More specifically, the array of image signals obtained from a specific block, e.g., 3 by 3, of image elements are mapped into a larger array of image signals, e.g., 4 by 4. The larger array, including some image signals that appear more than once, is then transformed in accordance with the characteristic Walsh-Hadamard linear combinations appropriate for the larger array. In effect, the Walsh-Hadamard transformation method is collapsed upon a smaller block of image elements than is usual for the given size of transform. By completing the coefficient modification and inverse transforming with respect to the larger signal array, a better compromise is struck between the removal of "false edge" artifacts and the preservation of low-contrast detail.

The image processing method in accordance with the invention is an improvement upon prior image processing methods using the Walsh-Hadamard transformation. Image signals representative of the light value of elements of the image are grouped into arrays of signals prior to being transformed. The signals comprising these arrays are fewer than the number of signals ordinarily required by the particular size of Walsh-Hadamard transform in use. The improvement comprises mapping these fewer signals into yet larger signal arrays such that one or more image signals appear two or more times in the larger array. Then the larger number of signals comprising these larger arrays are transformed in accordance with the Walsh-Hadamard linear combinations appropriate for the larger array.

More specifically, the invention provides an improved method of transform processing of an image for both reducing noise and preserving image structure, particularly low contrast detail, such as edges. The coefficient signals resulting from transformation of the above-mentioned larger arrays represent combinations of image signals sensitive to a smoothed light value and to differences in light value among image elements. One or more of the coefficient signals are modified—as by coring or clipping—in order to reduce noise in the processed image, thereby preserving the residual image structure. Finally, the processed image having reduced noise is generated from these coefficient signals, some of which may have been modified in the preceding steps. In a specific embodiment, a 3 by 3 array of image signals is mapped into a 4 by 4 array such that the middle column and middle row of the smaller array are each duplicated in the larger array. The signals constituting the larger array are then transformed in accordance with the Walsh-Hadamard combinations appropriate for a 4 by 4 array of signals.

BRIEF DESCRIPTION OF THE DRAWINGS

The invention will be described with reference to the figures, wherein:

FIGS. 1 and 2 are tabular listings of the arithmetic combinations for generating the coefficient signals of a 2 by 2 and 4 by 4 Walsh-Hadamard transform, respectively;

FIG. 3 is a tabular listing of the arithmetic combinations for generating the coefficient signals characteristic of a 4 by 4 Walsh-Hadamard transform but "collapsed" upon a 3 by 3 field of image elements in accordance with the invention;

FIGS. 5A and 5B are diagrams of the weighting arrays used for the prefilters of FIG. 4;

FIGS. 6A, 6B and 6C are diagrams illustrating the particular image signals selected for transformation at each stage of the method in accordance with the embodiment of FIG. 4;

DETAILED DESCRIPTION OF THE PREFERRED EMBODIMENTS

Figure 4:
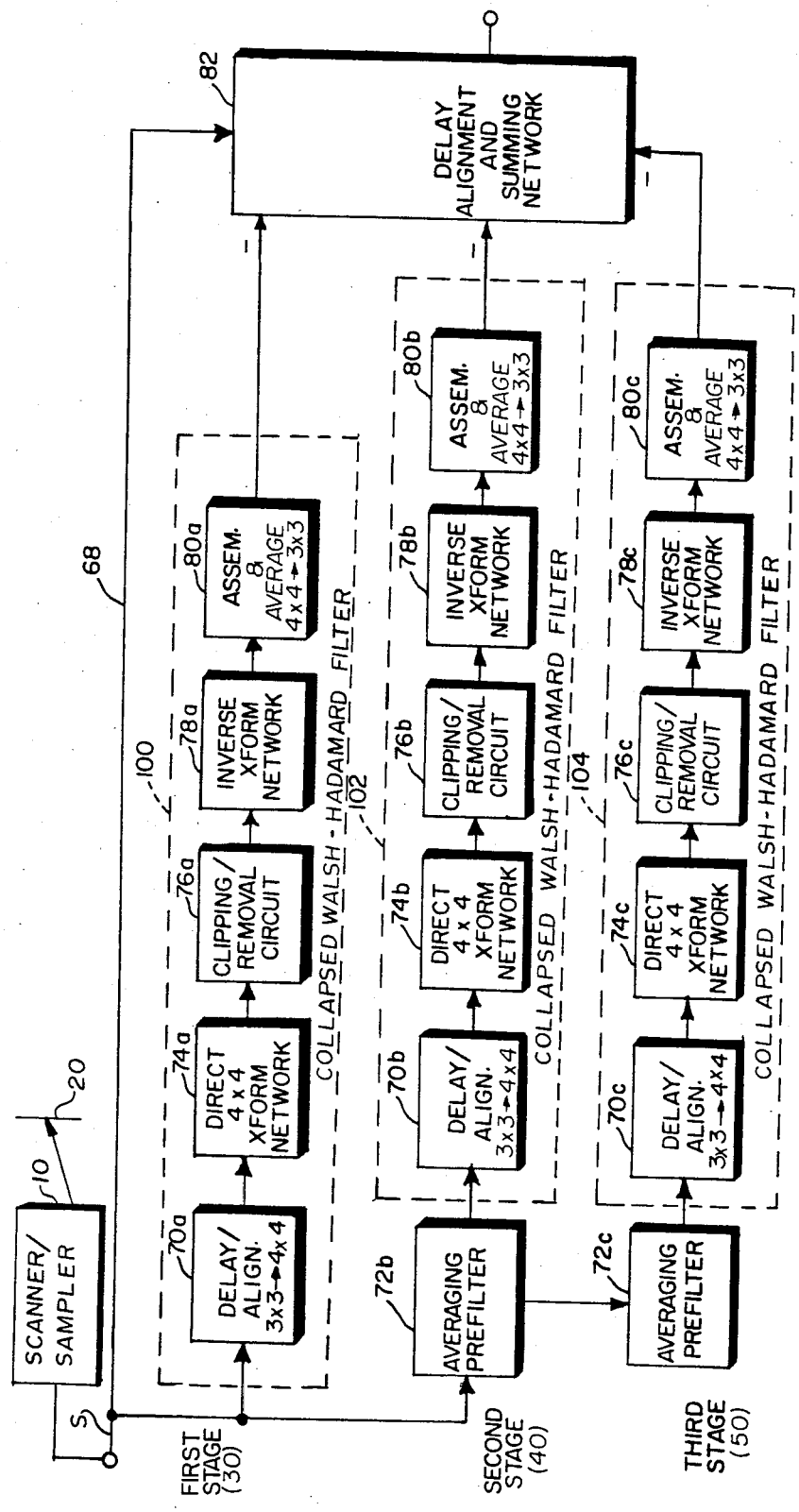
FIG. 4 is a block diagram of an image processing method in accordance with the invention.

The input signal in the following description is generated by the scanning and sampling of an original image. For purposes of describing the preferred embodiment the input signal is assumed to be generated from an image such as a negative or positive photographic transparency. It is further understood that such a signal may represent a variety of spatial components of the image, including an average light value level, fine detail such as fine edges, lines and textures; intermediate detail such as broader edges and small features; and coarse detail such as shaded modeling and other gradually varying features. (Modeling as here used refers to the rendition of smoothly varying features or details.) In addition, the signal includes a noise component affecting most of the spatial components to some degree. With a photographic transparency, much of such noise originates with the random distribution of the light-absorbing particles that form the basis of this image-recording system. While the invention will be described in connection with sampled data from a photographic transparency, it should be understood that the input signal can represent other information or data, such as would be derived from directly scanning an object, from a composite video signal, or from image information in optical/electrical/magnetic storage. In such cases the noise originates in other characteristics of the signal generating system.

The invention will be described in accordance with a modification applied to a 4 by 4 Walsh-Hadamard transformation. Ordinarily, in taking a 4 by 4 transform of the image signals, the signal values involved in the transformation include samples taken from 4 elements of 4 lines of the original image, for a total of 16 signals from 16 samples. I have recognized that the techniques of direct and inverse Walsh-Hadamard transformation are still useful and valid if the signal values are accumulated and ordered in a different pattern.

More specifically, the sixteen signal values for the transformation are taken from the nine elements of a 3 by 3 block instead of the sixteen elements of a 4 by 4 block. That is, from the 3 by 3 block of image elements $$\begin{bmatrix} A_{11} & A_{12} & A_{13} \\ A_{21} & A_{22} & A_{23} \\ A_{31} & A_{32} & A_{33} \end{bmatrix} \quad (2)$$

a 3 by 3 array of image signals $a_{ij}$, $$\begin{bmatrix} a_{11} & a_{12} & a_{13} \\ a_{21} & a_{22} & a_{23} \\ a_{31} & a_{32} & a_{33} \end{bmatrix} \quad (3)$$

is generated from the light values of the image elements.

These nine image signals $a_{11} \ldots a_{33}$ are mapped into a 4 by 4 array of image signals suitable for transformation, as follows.

$$\begin{bmatrix} (a_{11}) & (a_{12}) & (a_{12}) & (a_{13}) \\ (a_{21}) & (a_{22}) & (a_{22}) & (a_{23}) \\ (a_{21}) & (a_{22}) & (a_{22}) & (a_{23}) \\ (a_{31}) & (a_{32}) & (a_{32}) & (a_{33}) \end{bmatrix} \quad (4)$$

This is done by using image signals $a_{11}$, $a_{13}$, $a_{31}$, and $a_{33}$ once; $a_{12}$, $a_{21}$, $a_{23}$ and $a_{32}$ twice; and $a_{22}$ four times. An array of sixteen coefficient signals $c_{ij}$, $$\begin{bmatrix} c_{11} & c_{12} & c_{13} & c_{14} \\ c_{21} & c_{22} & c_{23} & c_{24} \\ c_{31} & c_{32} & c_{33} & c_{34} \\ c_{41} & c_{42} & c_{43} & c_{44} \end{bmatrix} \quad (5)$$

is generated from the 4 by 4 array (4) of image signals in sixteen arithmetic combinations identical to those used [combinations (1)] for the 4 by 4 Walsh-Hadamard transform, excepting that certain of the image signals appear more than once in a given linear combination, as follows (in part).

$$c_{11} = a_{11} + a_{12} + a_{12} + a_{13} + a_{21} + a_{22} + a_{22} + a_{23} + \quad (6)$$
$$a_{21} + a_{22} + a_{22} + a_{23} + a_{31} + a_{32} + a_{32} + a_{33}$$
$$c_{12} = a_{11} + a_{12} - a_{12} - a_{13} + a_{21} + a_{22} - a_{22} - a_{23} +$$
$$a_{21} + a_{22} - a_{22} - a_{23} + a_{31} + a_{32} - a_{32} - a_{33}$$
$$c_{13} = a_{11} - a_{12} - a_{12} + a_{13} + a_{21} - a_{22} - a_{22} + a_{23} +$$
$$a_{21} - a_{22} - a_{22} + a_{23} + a_{31} - a_{32} - a_{32} + a_{33}$$

-continued $$c_{44} = a_{11} - a_{12} + a_{12} - a_{13} - a_{21} + a_{22} - a_{22} + a_{23} +$$
$$a_{21} - a_{22} + a_{22} - a_{23} - a_{31} + a_{32} - a_{32} + a_{33}$$

Because of the duplication among image signals, combinations (6) reduce to (in part)

(7)

$$c_{11} = a_{11} + 2a_{12} + a_{13} + 2a_{21} + 4a_{22} + 2a_{23} + a_{31} + 2a_{32} + a_{33}$$
$$c_{12} = a_{11} - a_{13} + 2a_{21} - 2a_{23} + a_{31} - a_{33}$$
$$c_{13} = a_{11} - 2a_{12} + a_{13} + 2a_{21} - 4a_{22} + 2a_{23} + a_{31} - 2a_{32} + a_{33}$$
.
$$c_{44} = a_{11} - a_{13} - a_{31} + a_{33}$$

Figure 2:
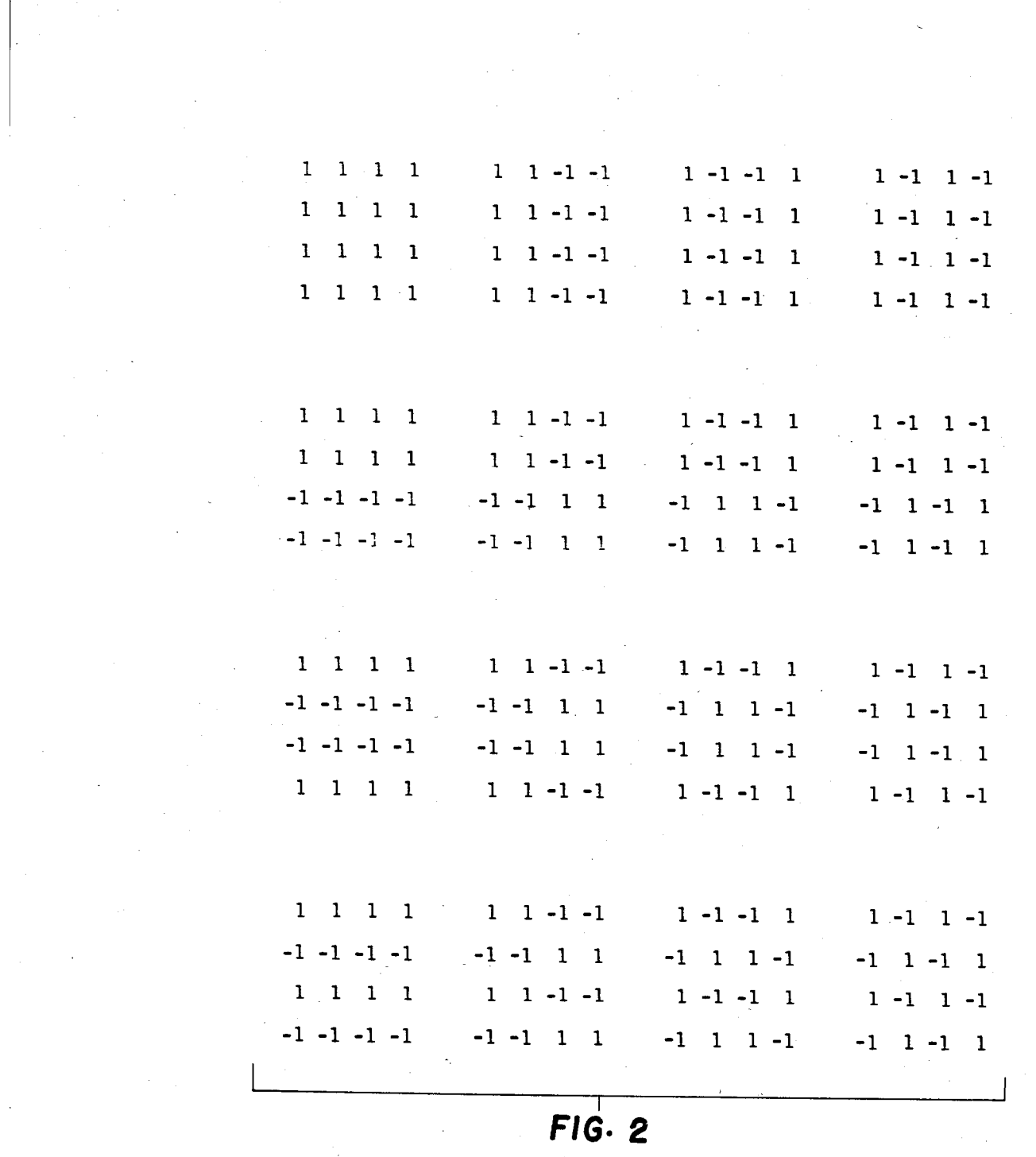
Figure 3:
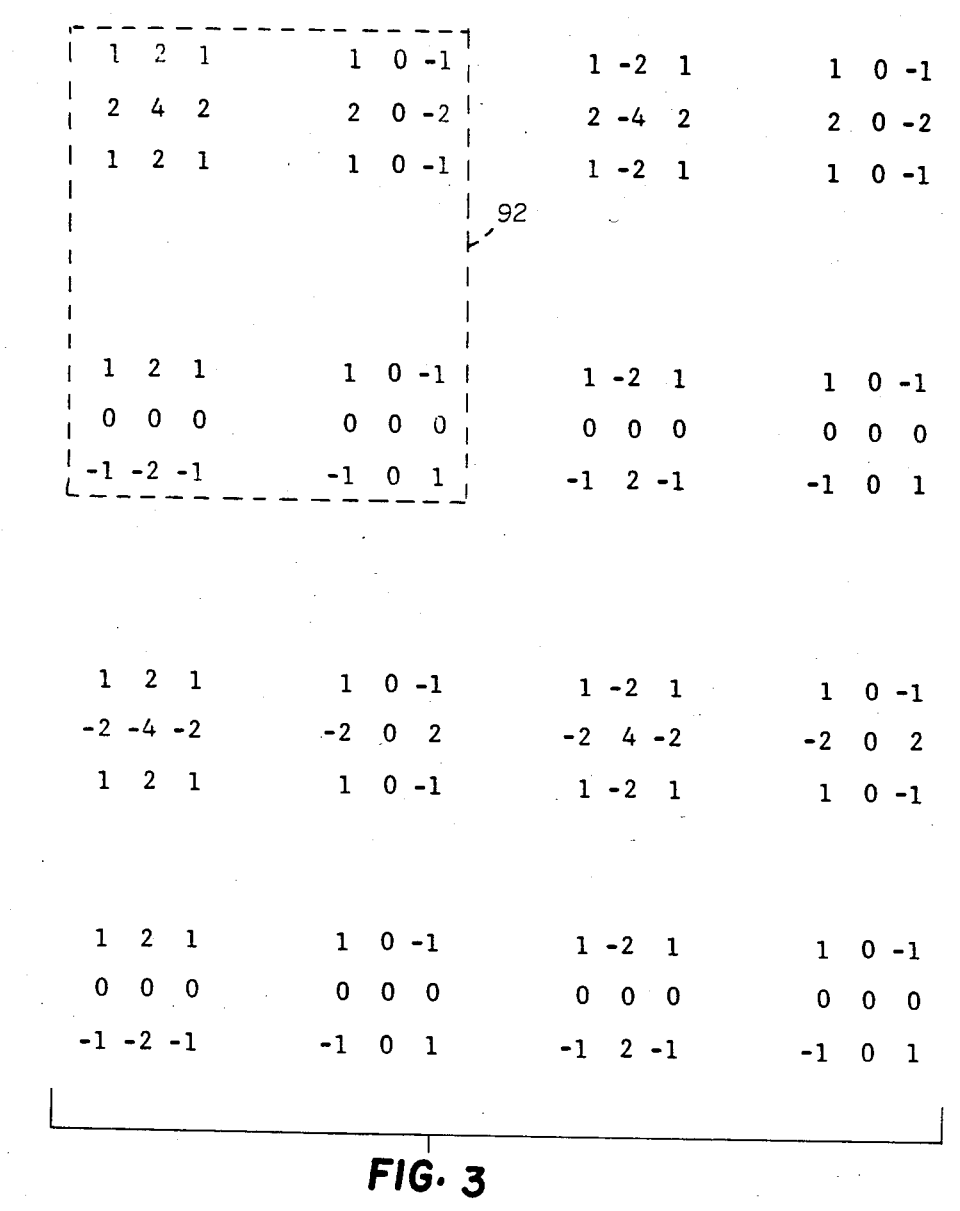

FIG. 3 is a list of the sixteen arrays of multipliers (ranging from 0 to ±4) used in these sixteen arithmetic combinations for generating the corresponding sixteen coefficient signals $c_{ij}$. (As with the 4 by 4 Walsh-Hadamard transform, it is evident from FIG. 3 how to construct the linear combinations not shown above). The list of arrays in FIG. 3 can also be derived by inspecting FIG. 2 and combining like signals. In other words, by applying the same weight of ±1 to each signal value as shown in the arithmetic combinations of FIG. 2 and combining the weights for the elements used more than once, the sixteen combinations illustrated in FIG. 2 are condensed into the sixteen "collapsed" arithmetic combinations of FIG. 3. When incorporating these modifications, the Walsh-Hadamard transform will be hereinafter referred to as a "collapsed" Walsh-Hadamard transform since the characteristic linear combinations are "collapsed" upon a smaller field of image elements than is conventional in the prior art.

An image processing method incorporating the "collapsed" Walsh-Hadamard transform is implemented as shown in block form in FIG. 4. This method is generally of the type described in the aforementioned patent application Ser. No. 522,284. Parts of the method especially relating to the "collapsed" transformation are shown in accordance with the present invention. Conventional scanning and sampling apparatus 10 generates a stream of image signals by scanning a photographic negative 20. Each signal relates to the light value of a respective element of an original image on the negative 20. This signal stream, hereinafter called signal stream S, is processed through three stages. Each stage conveys signals sensitive to particular spatial components of the image: a first stage 30 conveys fine detail signals, a second stage 40 conveys intermediate detail signals and a third stage 50 conveys coarse detail signals. Noise signals, due to photographic grain, are distributed across all stages. The spatial scale of the noise signals in each stage corresponds to the spatial scale of the corresponding detail.

Figures 1, 5, 6:
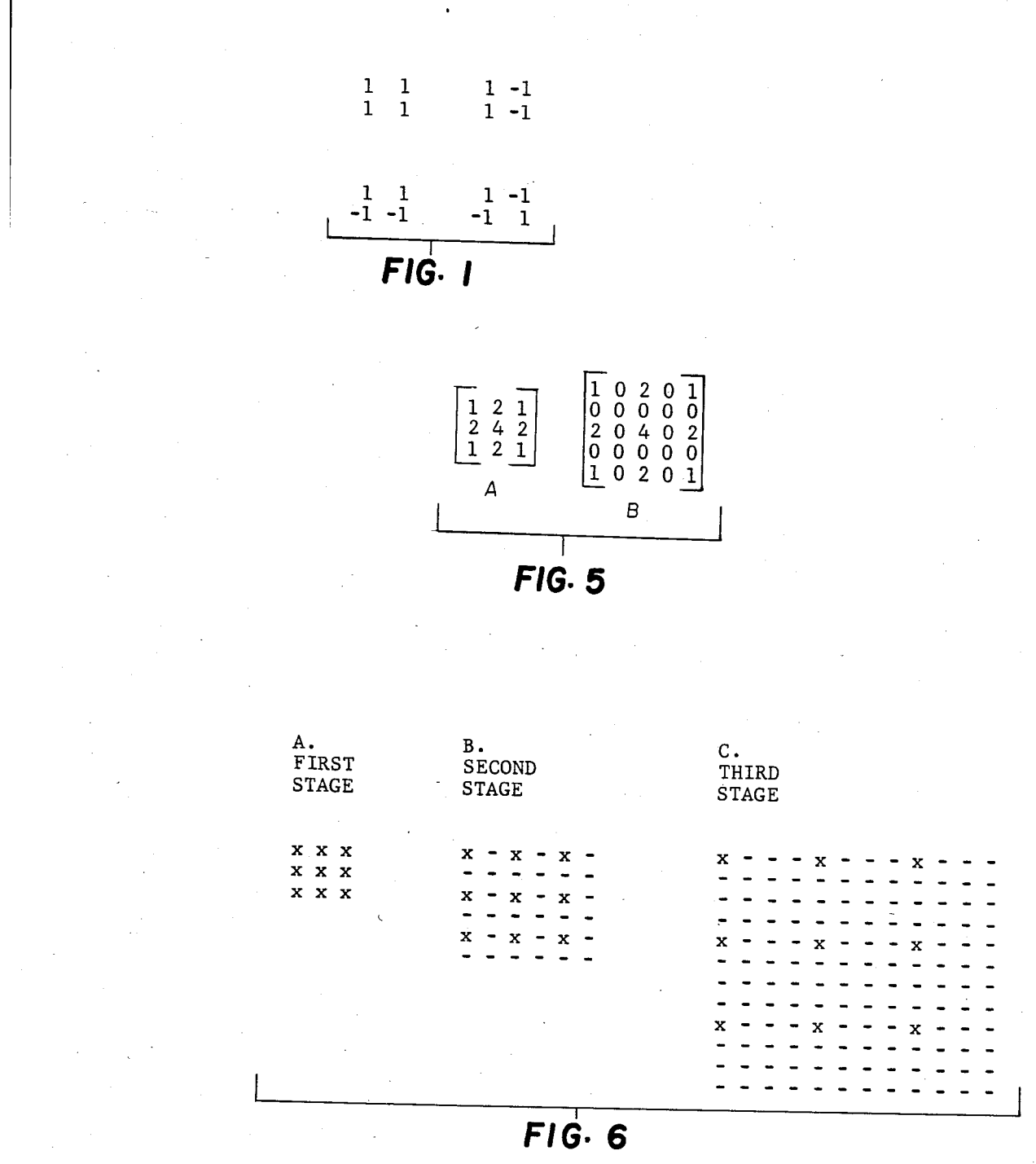

The "collapsed" 4 by 4 Walsh-Hadamard transform is used in each of the three stages shown in FIG. 4. Since each stage processes differently scaled detail and the same number of transform coefficient signals are available in each stage, the image signals generated for each stage after the first should be filtered or processed versions of either the original image signals or those signals processed in some preceding stage. For that purpose, suitably low-pass prefiltered image signals related to the average light value of areas of the original image are provided in the second and third stages by use of averaging prefilters 72b and 72c. In the averaging prefilter 72b each image signal of the original image is replaced by a weighted average over a neighborhood of the original image signal in accordance with the weighting pattern of FIG. 5A. In the averaging prefilter 72c, each of the once-averaged image signals is replaced by a weighted average over the larger neighborhood of once-averaged signals as indicated by the pattern of FIG. 5B (in each case, the signal being replaced corresponds to the center weight of 4).

Although sixteen image signals are being transformed at one time in each stage, the sampling pattern of the image signals forming each 3 by 3 signal array processed by the "collapsed" Walsh-Hadamard transform, i.e., whether the signals comprising each array are adjacent or separated by "intervening" image signals, will depend on which stage is involved. FIG. 6 illustrates the pattern of particular image signals selected for the "collapsed" Walsh-Hadamard transformation at each stage. The letter x represents the image signals (including averaged image signals in the case of the second or third stage) selected at a particular moment to form the 3 by 3 signal arrays at each stage, while the dashes represent image signals (or averaged image signals) that do not provide inputs to the respective pattern at that moment.

In each stage, the continuous stream of such signal arrays effects a shifting of block boundary locations between successive blocks so as to cause block/block overlap. If the block/block overlap amounts to a shift of a single image element from the previous block, the selection of the array (3) of nine image signals for transformation at each stage means that each image signal in each stage contributes to the transformation of nine arrays (3) of image signals. (More information regarding a block overlap transformation procedure is found in copending Ser. No. 441,826, now U.S. Pat. No. 4,442,454.) However, since each image signal in any stage after the first is a filtered version of some preceding image signal, the nine image signals selected for transformation in such stages already include contributions from neighboring image signals due to the filtering process.

Referring again to FIG. 4, the stream of image signals S is directly presented to a delay and alignment network 70a in the first stage and to the averaging prefilter 72b in the second stage; from the second stage the once-averaged image signals are presented to the averaging prefilter 72c. In addition, the stream of signals S bypass all stages on a line 68. In the first stage 30, the delay and alignment network 70a presents an array of image signals to a transform network 74a for effecting the "collapsed" Walsh-Hadamard transformation. The stream of once-averaged image signals from the prefilter 72b is applied to a delay and alignment network 70b in the second stage 40, which presents an array of once-averaged image signals to a transform network 74b for effecting the "collapsed" Walsh-Hadamard transformation. The stream of twice-averaged image signals from the prefilter 72c is applied to a third delay and alignment network 70c, which presents an array of twice-averaged image signals to a transform network 74c for effecting the "collapsed" Walsh-Hadamard transformation in the third stage 50.

Each delay and alignment network 70a, 70b and 70c is so configured as to map the array (3) of particular image signals that are selected (relative to the image signal locations x of FIG. 6) into the larger signal array (4) for the 4 by 4 "collapsed" Walsh-Hadamard transformation at each stage. That is, in the first stage 30 the 4 by 4 "collapsed" Walsh-Hadamard transform operates on sixteen image signals (some being the same) assembled from nine image signals from the incoming signal stream S. In the second stage 40 the 4 by 4 "collapsed" Walsh-Hadamard transform operates on sixteen image signals assembled from nine image signals taken from the next adjacent image signals of next adjacent rows of the once-averaged image signals presented by one alignment of the incoming stream of signals. In the third stage 50, the 4 by 4 "collapsed" Walsh-Hadamard transform operates on sixteen image signals assembled from nine image signals taken from fourth adjacent image signals of fourth adjacent rows of the twice-averaged image signals presented by one alignment of the incoming stream of signals. In the next alignment of the incoming stream of image signals, new sets of nine image signals are presented to the delay and alignment stages, which present sixteen image signals to the respective transform networks. Every image signal therefore enters into nine image signal arrays in each stage (assuming one image element displacement between overlapped blocks). As a result of the second and third stages of processing averaged image signals, a large number of elements of the original image influence the reconstruction of each image element in the processed image.

Each transform network 74a, 74b and 74c transforms the image signals by a set of linear combinations (characteristic of the 4 by 4 Walsh-Hadamard transform) into a corresponding set of coefficient signals representative of a smoothed light value and differences in light value between image elements. (Smoothed light value is meant to include average, weighted average or other kinds of mean light values). The application of the sixteen arithmetic combinations defined by the arrays of FIG. 3 represents this process for the "collapsed" by 4 by 4 Walsh-Hadamard transform. These arithmetic combinations generate the 4 by 4 array (5) of coefficient signals $c_{ij}$. Sets of these coefficient signals are presented to respective clipping/removal circuits 76a, 76b and 76c, each of which have clipping levels chosen according to the expected noise levels (that is, noise as expressed in the transform coefficient signals conveyed through each of the stages). This being a clipping type of noise reduction process, coefficient signals less than the clipping levels—representing most of the noise—are passed unaffected to inverse transform networks 78a, 78b and 78c; coefficient signals greater than the clipping levels—representing most of the image information—are set to zero.

The results of the inverse transformation in the inverse transform networks 78a, 78b and 78c constitute arrays of processed signal components $a'_{ij}$ corresponding to the image signal locations x shown in FIGS. 6A, 6B and 6C respectively. These processed signal components are presented to respective assembly/averaging networks 80a, 80b and 80c in which the nine signal components (due to block/block overlap in each stage) pertaining to each image element are assembled by properly arranged delay elements and averaged together. The averaged, processed image signals (now predominantly noise) from each stage are then presented to the delay, alignment and summing network 82, which provides delays to compensate for the delays incorporated in the respective stages, aligns the processed image signals and subtracts these signals (which are predominantly noise signals) produced by all three stages from the unmodified full-band image signal presented on the line 68.

In accordance with the teaching of the heretofore cited patent application Ser. No. 522,284, the coefficient signals $c_{11}$, $c_{12}$, $c_{21}$ and $c_{22}$ resulting from the four arithmetic operations outlined in broken line 92 (FIG. 3) are set aside and not used during inversion. By regenerating the image signals from the signals resulting from the remaining twelve coefficient operations (which were clipped in the circuits 76a, 76b and 76c and inverted in the networks 78a, 78b and 78c), the objectionable artifact of "false edges" is reduced. By using the "collapsed" Walsh-Hadamard transform on a 3 by 3 block of image elements, local low contrast detail—such as low contrast edges—is better preserved than if the Walsh-Hadamard transform was used in conjunction with a 4 by 4 block of image elements. Consequently, a better balance is struck between artifact and image structure than is known to the prior art.

Figure 7:
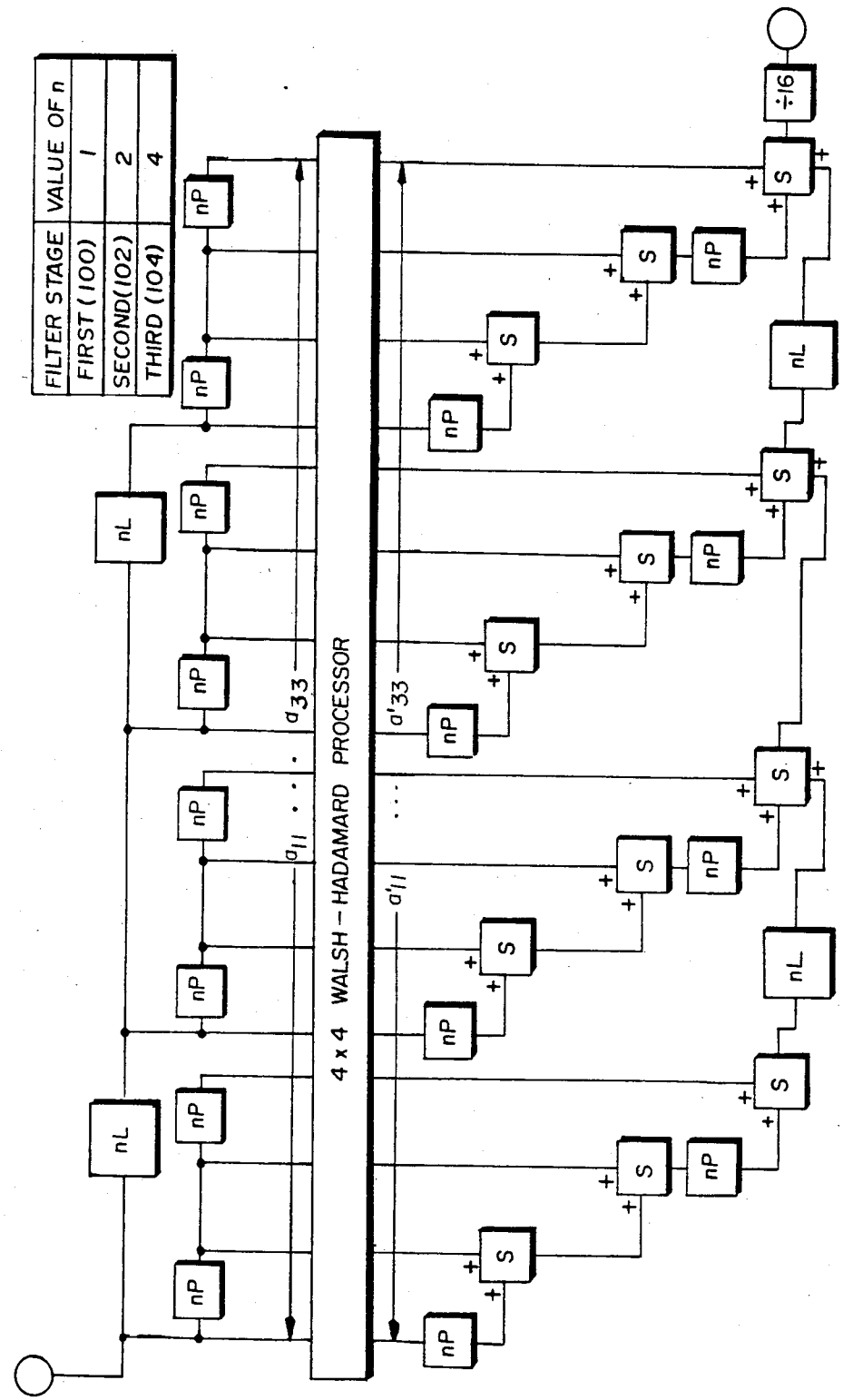
FIG. 7 is a generalized circuit diagram for implementing the first, second and third stage filters of FIG. 4.

An image processing method employing a "collapsed" Walsh-Hadamard transform according to the present invention may be implemented by application of conventional digital hardware or by suitable programming of a digital computer. Such digital circuit design or software programming is conventional and within the capability of one of ordinary skill in these arts, given the preceding descriptions of the method in accordance with the invention. One implementation in conventional digital hardware is described in relation to FIGS. 7-14. In this connection, portions of the block diagram of FIG. 4 constituting the respective filter stages are enclosed in broken lines. Henceforth, the box 100 will be referred to as the first stage "collapsed" 4 by 4 Walsh-Hadamard filter, the box 102 as the second stage "collapsed" 4 by 4 Walsh-Hadamard filter, and the box 104 as the third stage "collapsed" 4 by 4 Walsh-Hadamard filter. FIG. 7 illustrates a hardware implementation of the respective "collapsed" Walsh-Hadamard filter stages—with the assignment of n indicating which stage the hardware will implement. Regarding other portions of FIG. 4, the averaging prefilters 72b and 72c are provided by the delay and summing elements shown in FIGS. 8 and 9, respectively. The delay, alignment and summing network 82 is provided by the delay and summing elements connecting the configuration of inputs shown in FIG. 10.

A number of similar components appear throughout the diagrams of FIGS. 7-14, as follows. Line and element delay units are specified by boxes that are labeled with an "L" or "P" respectively. Where appropriate, a multiple of "L" or "P" is specified in a single box to indicate a corresponding multiple unit delay. (In FIG. 7, the variable n signifies the multiplier for the delay. For the first stage, n=1; the second stage, n=2; and the third stage, n=4.) Summing points are specified by boxes that are labeled with an "S" and the prescribed signs of the inputs are specified by "+" or "−". Scaling operations are specified by boxes that are labeled with the division symbol "÷" followed by the particular divisor (i.e., scaling factor) employed in a specific operation. Moreover, the components for implementing the circuits described by FIGS. 7-14 are commonly obtained through ordinary supply sources. The choice of particular device types is well within the capability of those of ordinary skill in the electronics arts. Further device specification is believed unnecessary for practice of the method in accordance with the invention.

Figure 8:
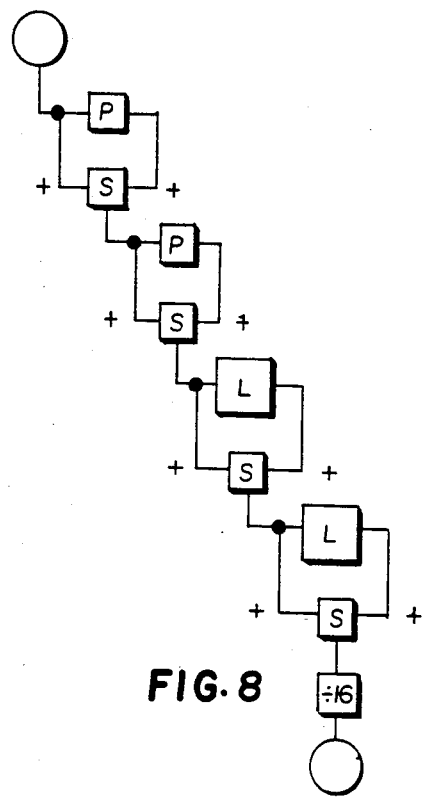
FIGS. 8 and 9 are circuit diagrams of the pair of averaging prefilters used in FIG. 4.
Figure 9:
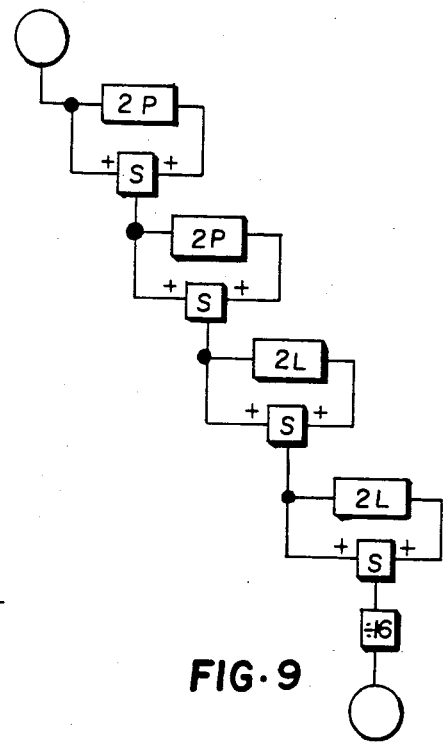

Referring concurrently to FIG. 4 and FIGS. 7-14, the stream of input image signals are presented simultaneously to the first stage filter 100 (FIG. 7, n=1) and to the second stage averaging prefilter 72b (FIG. 8). The structure of delay, summing, and averaging units illustrated in FIG. 8 implements the averaging pattern of FIG. 5A. The resultant average is delivered to the second stage "collapsed" Walsh-Hadamard filter 102 (FIG. 7, n=2) and to the third stage averaging prefilter 72c (FIG. 9). The structure of delay, summing, and averaging units illustrated in FIG. 9 implements the averaging pattern of FIG. 5B. The resultant average is delivered to the third stage Walsh-Hadamard filter 104 (FIG. 7, n=4).

Figure 11:
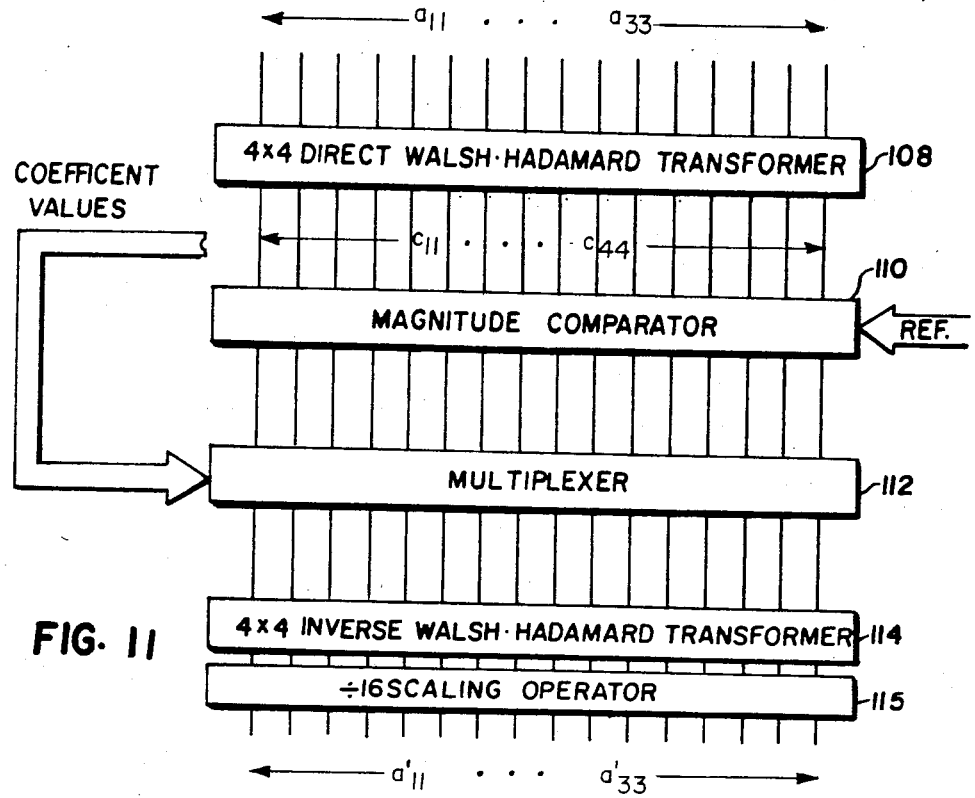
FIG. 11 is a circuit diagram of the Walsh-Hadamard processor incorporated in FIG. 7.

Each "collapsed" Walsh-Hadamard filter (FIG. 4) includes a 4 by 4 Walsh-Hadamard processor 106 (FIG. 7) which is shown in greater detail in FIG. 11. With reference to the components of FIGS. 4, 7 and 11, each processor 106 includes (1) the direct transform network 74a, 74b or 74c (shown as a 4 by 4 direct Walsh-Hadamard transformer 108 in FIG. 11) (2) the clipping-/removal circuits 76a, 76b or 76c (shown as a magnitude comparator 110 and a multiplexer 112 in FIG. 11) and (3) the inverse transform network 78a, 78b or 78c (shown as a 4 by 4 inverse Walsh-Hadamard transformer 114 in FIG. 11). The network of delay units preceding the processor 106 in the diagram of FIG. 7 corresponds to the respective delay and alignment network 70a, 70b or 70c utilized in the respective stages of the apparatus of FIG. 4. The delay elements leading to the processor 106 assemble the image signals $a_{ij}$ resulting from the block (2) of nine sampled image elements $A_{ij}$ into an array (4) of sixteen image signals, some of which are duplicates of others. The assignment of the number n (n=1, 2 or 4) corresponds to the particular stage being assembled, each stage sampling the image in accordance with the respective patterns of FIGS. 6A, 6B and 6C. The network of delay and summing units following the processor 106 in the diagram of FIG. 7 corresponds to the respective assembly and averaging network 80a, 80b or 80c shown in FIG. 4.

Figure 12:
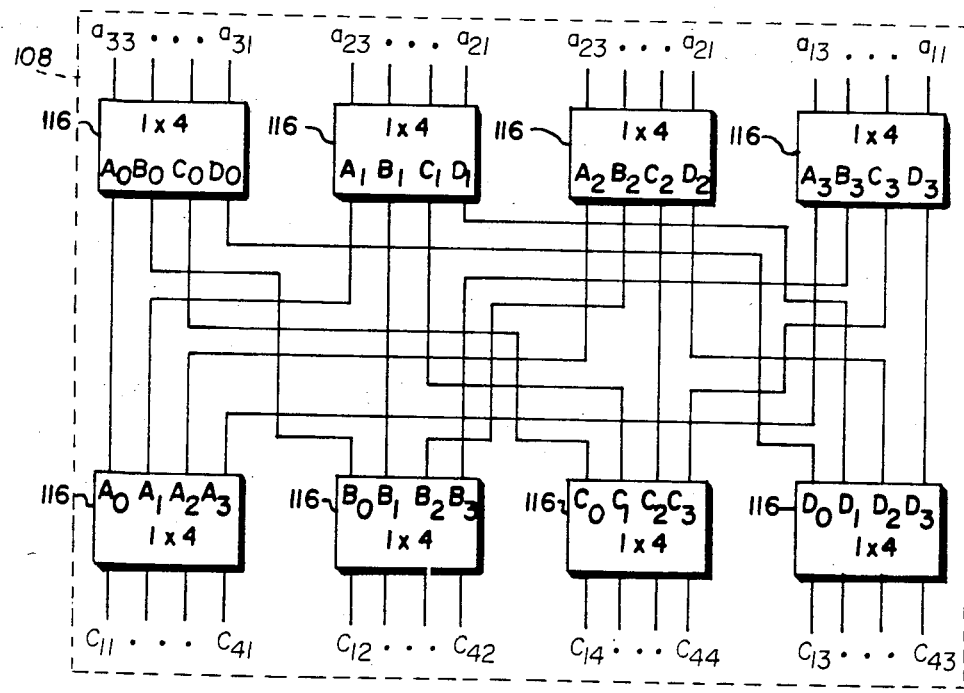
FIG. 12 is a circuit diagram of a configuration of 1 by 4 arithmetic networks for implementing the direct and inverse transformers of FIG. 11.
Figure 13:
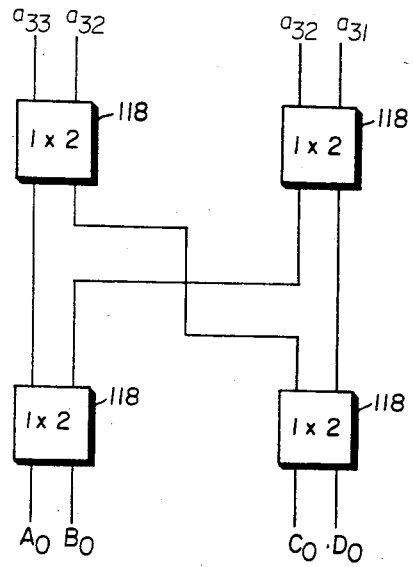
FIG. 13 is a circuit diagram of one of the 1 by 4 arithmetic networks incorporated in FIG. 12.
Figure 14:
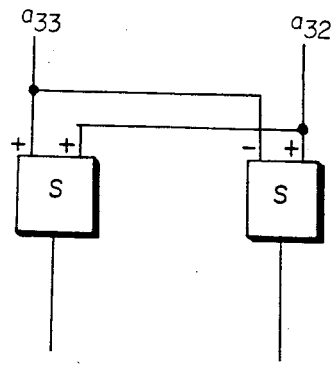
FIG. 14 is a circuit diagram of the summing components comprising each of the 1 by 2 arithmetic networks incorporated in FIG. 13.

Referring now to FIG. 11, the sixteen input image signals $a_{11} \ldots a_{33}$ (some appearing more than once) are presented to the 4 by 4 direct Walsh-Hadamard transformer 108, which performs a 4 by 4 Walsh-Hadamard transform on the input signals and generates sixteen transform coefficient signals $c_{11} \ldots c_{44}$. The direct Walsh-Hadamard transformer 108 as shown in FIG. 12 employs a battery of 1 by 4 arithmetic networks 116. The schematic 4 arithmetic network 116 operating for a single 1 by arithmetic network 116 operating on four image signals is shown in FIG. 13 in which the required calculations are implemented by a set of 1 by 2 arithmetic networks 118, each of which is composed of a summing network shown in FIG. 14. The other 1 by 4 arithmetic networks of FIG. 12 are the same excepting the respective input and output lines.

Certain of the Walsh-Hadamard transform coefficient signals are compared to respective magnitude references (i.e., thresholds) in the magnitude comparator 110 (FIG. 11). If any of the coefficient signals have a magnitude value exceeding the corresponding reference, a bit is set to the multiplexer 112 causing the multiplexer 112 to set the corresponding coefficient signal to zero. Otherwise the input coefficient signals are switched to the 4 by 4 inverse Walsh-Hadamard transformer 114 without change. Four of the coefficient signals—those generated by the operations within the broken line box 92 of FIG. 3—are set to zero. For implementing the inverse Walsh-Hadamard transform, the 4 by 4 inverse Walsh-Hadamard transformer 114 is constructed the same as the 4 by 4 direct Walsh-Hadamard transformer 108 with inputs now being the twelve modified coefficient signals. The processed image signals $a'_{11} \ldots a'_{33}$ are then divided by sixteen and presented to the network of delay and summing units following the processor 106 of FIG. 7. In this network, nine signal components (due to block/block overlap) pertaining to each image element are assembled by the arranged delay elements and averaged together.

The second and third stage "collapsed" Walsh-Hadamard filters 102 and 104 are implemented with the same arrangement of digital devices as for the first stage, the difference being that n is set to 2 and 4, respectively, to account for multiple delays in the networks preceding and succeeding the 4 by 4 Walsh-Hadamard processor 106 of FIG. 7.

Figure 10:
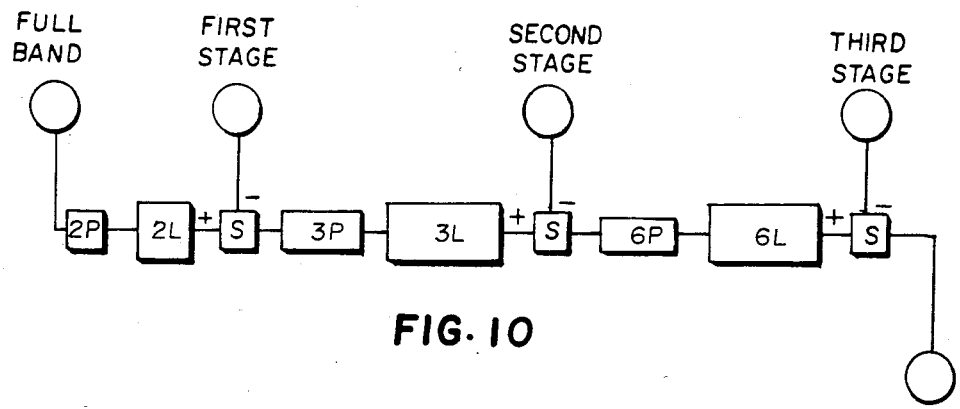
FIG. 10 is a circuit diagram of the delay, alignment and summing network utilized in FIG. 4 to receive the full-band signal and the signal output from the first, second and third stage filters.

The averaged signals (now predominantly noise) from each "collapsed" Walsh-Hadamard filter stage of FIG. 4 are presented to the delay, alignment and summing network 82, which provides delays to compensate for the delays incorporated in the respective stages, and aligns and subtracts the signals produced by the three stages from the unmodified full-band signal S presented on the line 68. The configuration of delay and summing elements diagrammed in FIG. 10 provides the necessary delay, alignment and summing required by the network 82, if the full-band signal and the output signals from the respective "collapsed" Walsh-Hadamard filter stages are connected as indicated.

While the disclosed embodiment of the invention describes the mapping of a 3 by 3 array of image signals—derived from a 3 by 3 block of image elements—into a 4 by 4 array of image signals suitable for 4 by 4 Walsh-Hadamard transformation, such an example is not to be construed as limiting the application of the invention. In general, the image processing method of the invention may be practiced by mapping any p by q array of image signals—derived from the light values of a p by q block of image elements—into a larger m by n array of image signals suitable for transformation by the characteristic Walsh-Hadamard combinations appropriate for the larger m by n array of signals. As one way of practicing the invention, such mapping may be accomplished in steps, by mapping the smaller p by q array into an intermediate p by n array such that two or more columns of the p by n array are duplicates of at least one column of the p by q array. Then the intermediate p by n array is mapped into the larger m by n array such that two or more rows of the m by n array are duplicates of at least one row of the p by q array. In terms of the image signal arrays already discussed, the 3 by 3 array of image signals $$\begin{bmatrix} a_{11} & a_{12} & a_{13} \\ a_{21} & a_{22} & a_{23} \\ a_{31} & a_{32} & a_{33} \end{bmatrix}$$

is mapped into an intermediate 3 by 4 array $$\begin{bmatrix} a_{11} & a_{12} & a_{12} & a_{13} \\ a_{21} & a_{22} & a_{22} & a_{23} \\ a_{31} & a_{32} & a_{32} & a_{33} \end{bmatrix}$$

such that the second and third columns of the intermediate array are duplicates of the second column of the smaller 3 by 3 array. Then the intermediate 3 by 4 array is mapped into the larger 4 by 4 array $$\begin{bmatrix} a_{11} & a_{12} & a_{12} & a_{13} \\ a_{21} & a_{22} & a_{22} & a_{23} \\ a_{21} & a_{22} & a_{22} & a_{23} \\ a_{31} & a_{32} & a_{32} & a_{33} \end{bmatrix}$$

such that the second and third rows of the larger 4 by 4 array are duplicates of the second row of the intermediate 3 by 4 array. Alternatively, the steps could be reversed; the middle row of the 3 by 3 array could be mapped into the middle two rows of a 4 by 3 intermediate array, followed by the middle column of the 4 by 3 array into the middle two columns of the 4 by 4 array. Clearly, these techniques may be used to convert between other than 3 by 3 and 4 by 4 arrays, e.g., between 3 by 3 or larger arrays and 5 by 5 or larger arrays, and so on. Furthermore, the invention may be practiced in one dimension, that is, by converting a 1 by q (or p by 1) signal array into a larger 1 by n (or m by 1) signal array suitable for transformation by the Walsh-Hadamard transform appropriate for the larger string of signals in that single dimension.

The invention has been described in detail with particular reference to presently preferred embodiments thereof, but it will be understood that variations and modifications can be effected within the spirit and scope of the invention.

What is claimed is:

1. In an image processing method of the type using a Walsh-Hadamard transformation, in which image signals representative of the light value of elements of the image are grouped into arrays of signals prior to transformation, the improvement wherein the signals from each array are mapped into a larger array such that one or more image signals appear two or more times in the larger array and the signals constituting the larger array are then transformed in accordance with the Walsh-Hadamard combinations characteristic of the larger array.

2. In an image processing method of the type using a Walsh-Hadamard transformation, in which image signals representative of the light value of elements of the image are grouped into signal arrays suitable for transformation, the improvement wherein the signals comprising each said signal array originate from signals comprising a smaller array of image signals aligned to a corresponding block of image elements such that said signal array includes multiple contributions from one or more signals of said smaller array.

3. In an image processing method of the type using a Walsh-Hadamard transform, wherein a p by q array of image signals representative of the light value of a p by q block of image elements are selected for transformation, the improvement wherein the signals constituting each p by q array are mapped into a larger m by n array such that at least one column of the p by q array is duplicated so as to provide the additional columns of the larger m by n array, and the signals constituting the larger m by n array are then transformed in accordance with the Walsh-Hadamard combinations characteristic of an m by n array of signals.

4. The method as claimed in claim 3 wherein at least one row of the p by q array is duplicated so as to provide the additional rows of the larger m by n array.

5. The method as claimed in claim 4 wherein p=q=3 and m=n=4 and wherein the p by q array is mapped into the larger m by n array by mapping the second column of the p by q array into the second and third columns of a p by n intermediate array, and then mapping the second row of the p by n intermediate array into the second and third rows of the m by n array.

6. A method of transform processing an image for noise reduction, comprising the steps of:
generating image signals representative of the light value of elements of the image;
forming the image signals into signal arrays according to patterns having predetermined locations in which the same image signal recurs in order to complete each array;
transforming each array of image signals by a set of arithmetic combinations characteristic of the Walsh-Hadamard transform into a set of coefficient signals representing combinations of image signals sensitive to a smoothed light value and to differences in light value among said image elements;
modifying one or more of the coefficient signals in order to reduce noise in the processed image; and
generating a processed image of reduced noise from said coefficient signals, some of which may have been modified.

7. the method as claimed in claim 6 wherein the step of modifying one or more of the ciefficient signals comprises the steps of (A) selecting certain coefficient signals by comparison to a threshold and (B) altering these selected coefficient signals.

8. An image processing method employing the Walsh-Hadamard transform in order to reduce noise and preserve image structure, such as edges, in a processed image, said method comprising the steps of:
generating image signals representative of the light value of specific elements of the image;
forming an enlarged array of signals suitable for transformation from a smaller number of image signals aligned to said specific elements, wherein one or more of the image signals are used more than once to occupy the additional rows and/or columns of the enlarged array;
transforming the signals constituting the enlarged array by means of the Walsh-Hadamard transform into a set of coefficient signals;
modifying the set of coefficient signals in order to reduce noise and preserve image structure, such as edges, in the processed image; and
generating a processed image from said modified set of coefficient signals.

9. The method as claimed in claim 8 wherein the enlarged array is a 4 by 4 array comprising sixteen signals and the smaller number of image signals comprises nine image signals derived from a 3 by 3 block of image elements.

10. The method as claimed in claim 8 wherein the step of modifying the set of coefficient signals comprises the steps of:
comparing the magnitude of the coefficient signals to at least one threshold of such magnitude(s) that greater coefficient magnitudes rarely occur due to noise above;
selecting coefficient signals that are less in magnitude than the said threshold(s); and
altering these selected coefficient signals by reducing their magnitudes.

11. The method as claimed in claim 8 wherein
(A) the step of generating image signals comprises additionally generating a full-band image signal that is not formed into enlarged arrays and transformed;
(B) the step of modifying the set of coefficient signals comprises the steps of:
comparing the magnitude of the coefficient signals to at least one threshold of such magnitude(s) that greater coefficient magnitudes rarely occur due to noise alone;
selecting coefficient signals that have magnitudes greater than the magnitude(s) of said threshold(s); and
altering these selected coefficient signals by reducing their magnitudes; and
(C) the step of generating a processed image comprises the steps of:
generating noise signals by inverse transforming the sets of coefficient signals, some of which have been altered in a preceding step; and
subtracting the noise signals from the full-band signal.

12. A method of transform processing an image for noise reduction and preservation of image structure, comprising the steps of:
generating image signals representative of the light value of elements of the image;
forming an m by n signal array from a p by q array of image signals, wherein the m by n array is larger than the p by q array and some image signals from the p by q array appear more than once in the m by n array;
transforming the signals constituting each m by n array by means of a m by n Walsh-Hadamard transform into a set of coefficient signals representing combinations of the image signals sensitive to noise and particular components of image structure;
modifying one or more of the coefficient signals in order to reduce noise in the processed image, thereby preserving the remaining image structure; and
generating a processed image from said coefficient signals.

* * * * *

UNITED STATES PATENT OFFICE
CERTIFICATE OF CORRECTION

PATENT NO. : 4,549,212
DATED : October 22, 1985
INVENTOR(S) : Bryce E. Bayer

It is certified that error appears in the above-identified patent and that said Letters Patent are hereby corrected as shown below:

Column 12, line 53, delete "4 arithmetic network 116 operating for a single 1 by" and insert --for a single 1 by 4-- in its place.

Signed and Sealed this

Twenty-first Day of January 1986

[SEAL]

Attest:

DONALD J. QUIGG

Attesting Officer

Commissioner of Patents and Trademarks